(12) United States Patent
Rolle et al.

(10) Patent No.: US 12,189,813 B2
(45) Date of Patent: Jan. 7, 2025

(54) MULTIPLE SYNONYMOUS IDENTIFIERS IN DATA PRIVACY INTEGRATION PROTOCOLS

(71) Applicant: SAP SE, Walldorf (DE)

(72) Inventors: Benny Rolle, Reinhardshagen (DE); Matthias Vogel, Saarbrücken (DE)

(73) Assignee: SAP SE, Walldorf (DE)

( * ) Notice: Subject to any disclaimer, the term of this patent is extended or adjusted under 35 U.S.C. 154(b) by 211 days.

(21) Appl. No.: 18/073,164

(22) Filed: Dec. 1, 2022

(65) Prior Publication Data

US 2024/0184914 A1    Jun. 6, 2024

(51) Int. Cl.
*G06F 21/62*    (2013.01)

(52) U.S. Cl.
CPC ............................. *G06F 21/6245* (2013.01)

(58) Field of Classification Search
CPC .................................................. G06F 21/6245
See application file for complete search history.

(56) References Cited

U.S. PATENT DOCUMENTS

| | | |
|---|---|---|
| 17,186 A | 5/1857 | Atwater |
| 17,457 A | 6/1857 | Tidgewell |
| 7,308,704 B2 | 12/2007 | Vogel et al. |
| 7,350,237 B2 | 3/2008 | Vogel et al. |
| 7,831,567 B2 | 11/2010 | Luther et al. |
| 8,566,193 B2 | 10/2013 | Singh et al. |
| 9,405,429 B1 | 8/2016 | Gopalakrishnan |
| 9,703,813 B2 | 7/2017 | Hegde et al. |
| 9,904,796 B2 | 2/2018 | Pluder et al. |
| 10,409,790 B2 | 9/2019 | Lehnert et al. |
| 10,430,413 B2 | 10/2019 | Christoph et al. |

(Continued)

FOREIGN PATENT DOCUMENTS

| | | |
|---|---|---|
| CA | 3096061 | 4/2023 |
| CN | 114092253 | 2/2022 |
| CN | 115809259 | 3/2023 |

OTHER PUBLICATIONS

U.S. Appl. No. 17/186,934, filed Feb. 26, 2021, Rolle et al.

(Continued)

*Primary Examiner* — Sm A Rahman
(74) *Attorney, Agent, or Firm* — Fish & Richardson P.C.

(57) ABSTRACT

The present disclosure involves systems, software, and computer implemented methods for using multiple synonymous identifiers in data privacy integration protocols. One example method includes identifying a request to initiate a protocol in a multiple-application landscape for an object with an identifier. A determination is made that at least one context-using application participant of the protocol relies on a context-providing application participant of the protocol for resolving the identifier to a local identifier local to a context of the context-providing application participant. A resolution request is sent to context-providing application participants that can provide resolution for an identifier for at least one context-using application. A local identifier corresponding to the identifier that is local to the context of the context-providing application participant is received from each context-providing application participant. A protocol work package that includes a resolved local identifier to is sent to each context-using application participant.

20 Claims, 11 Drawing Sheets

(56) References Cited

U.S. PATENT DOCUMENTS

| | | | |
|---|---|---|---|
| 10,552,642 | B2 | 2/2020 | Rolle et al. |
| 10,642,805 | B1 | 5/2020 | Masse |
| 10,754,932 | B2 | 8/2020 | Wiederspohn et al. |
| 10,776,254 | B1 | 9/2020 | Dhayanithi |
| 10,839,099 | B2 | 11/2020 | Vogel et al. |
| 10,909,222 | B1 | 2/2021 | Fregly et al. |
| 11,042,654 | B2 | 6/2021 | Nos et al. |
| 11,113,417 | B2 | 9/2021 | Rolle |
| 2007/0089117 | A1 | 4/2007 | Samson |
| 2008/0060051 | A1 | 3/2008 | Lim |
| 2008/0174425 | A1 | 7/2008 | Torning |
| 2009/0210394 | A1 | 8/2009 | Saravanan et al. |
| 2009/0228340 | A1 | 9/2009 | Bohannon |
| 2012/0036507 | A1 | 2/2012 | Jonnala et al. |
| 2013/0347064 | A1 | 12/2013 | Aissi |
| 2014/0032600 | A1 | 1/2014 | Sarferaz et al. |
| 2014/0059458 | A1 | 2/2014 | Levien et al. |
| 2014/0109238 | A1 | 4/2014 | Ravindran |
| 2014/0188572 | A1 | 7/2014 | Hegde et al. |
| 2014/0267770 | A1 | 9/2014 | Gervautz et al. |
| 2015/0242531 | A1 | 8/2015 | Rodniansky |
| 2016/0292455 | A1* | 10/2016 | Jebara ................. G06F 16/9535 |
| 2017/0006135 | A1 | 1/2017 | Siebel et al. |
| 2017/0091479 | A1 | 3/2017 | Pluder et al. |
| 2018/0101164 | A1 | 4/2018 | Noetzelmann et al. |
| 2018/0322279 | A1 | 11/2018 | Beskorovajnov et al. |
| 2019/0018985 | A1 | 1/2019 | Rolle et al. |
| 2019/0236294 | A1 | 8/2019 | McDonald et al. |
| 2019/0236334 | A1 | 8/2019 | Babushkin |
| 2020/0019728 | A1 | 1/2020 | Rolle |
| 2020/0285766 | A1 | 9/2020 | Jois et al. |
| 2021/0089678 | A1 | 3/2021 | Gkoulalas-Divanis et al. |
| 2021/0192052 | A1 | 6/2021 | Loch et al. |
| 2021/0209251 | A1 | 7/2021 | Parthasarathy |
| 2022/0043917 | A1 | 2/2022 | Rolle |
| 2022/0050834 | A1 | 2/2022 | Rolle et al. |
| 2022/0050920 | A1 | 2/2022 | Rolle |
| 2022/0058333 | A1 | 2/2022 | Rolle |
| 2022/0100755 | A1 | 3/2022 | Rolle |
| 2022/0207429 | A1 | 6/2022 | Haribhakti et al. |
| 2022/0277023 | A1 | 9/2022 | Rolle et al. |
| 2022/0300837 | A1 | 9/2022 | Shmelkin et al. |
| 2022/0309052 | A1 | 9/2022 | Rolle |
| 2023/0081785 | A1 | 3/2023 | Zhang |
| 2023/0177182 | A1* | 6/2023 | Rolle ................. G06F 21/6209 726/30 |
| 2023/0237192 | A1* | 7/2023 | Kahan .................... G06V 10/60 726/1 |
| 2023/0244637 | A1 | 8/2023 | Wu |

OTHER PUBLICATIONS

U.S. Appl. No. 17/457,797, filed Dec. 6, 2021, Ighoroje et al.
U.S. Appl. No. 17/457,802, filed Dec. 6, 2021, Rolle et al.
U.S. Appl. No. 17/457,811, filed Dec. 6, 2021, Rolle et al.
U.S. Appl. No. 17/457,816, filed Dec. 6, 2021, Vogel et al.
U.S. Appl. No. 17/457,824, filed Dec. 6, 2021, Vogel et al.
U.S. Appl. No. 17/457,827, filed Dec. 6, 2021, Ighoroje et al.
U.S. Appl. No. 17/680,717, filed Feb. 25, 2022, Rolle et al.
U.S. Appl. No. 17/680,741, filed Feb. 25, 2022, Rolle et al.
U.S. Appl. No. 17/680,759, filed Feb. 25, 2022, Rolle et al.
U.S. Appl. No. 17/680,858, filed Feb. 25, 2022, Rolle.
U.S. Appl. No. 17/702,013, filed Mar. 23, 2022, Rolle.
U.S. Appl. No. 17/718,770, filed Apr. 12, 2022, Rolle.
U.S. Appl. No. 18/049,063, filed Oct. 24, 2022, Hesse et al.
Wikipedia.org [online], "Hyperscale computing" created on May 2013, retrieved on Dec. 1, 2022, retrieved from URL <https://en.wikipedia.org/wiki/Hyperscale_computing>, 2 pages.
Wikipedia.org [online], "Information privacy" created on May 2003, retrieved on Dec. 6, 2021, retrieved from URL <https://en.wikipedia.org/wiki/Information_privacy>, 7 pages.
Wikipedia.org [online], "Master Data" created on Oct. 2006, retrieved on Dec. 6, 2021, retrieved from URL <https://en.wikipedia.org/wiki/Master_data>, 2 pages.
Wikipedia.org [online], "Personal Data" created on May 2005, retrieved on Dec. 6, 2021, retrieved from URL <https://en.wikipedia.org/wiki/Personal_data>, 7 pages.
Wikipedia.org [online], "Personal Identifier" created on Feb. 2007, retrieved on Dec. 1, 2022, retrieved from URL <https://en.wikipedia.org/wiki/Personal_identifier>, 3 pages.
U.S. Appl. No. 18/074,745, filed Dec. 5, 2022, Vogel et al.
U.S. Appl. No. 18/077,476, filed Dec. 8, 2022, Rolle et al.
U.S. Appl. No. 18/077,493, filed Dec. 8, 2022, Rolle et al.
Non-Final Office Action in U.S. Appl. No. 17/702,013, mailed on Jan. 4, 2024, 9 pages.
Non-Final Office Action in U.S. Appl. No. 17/457,811, mailed on Dec. 20, 2023, 27 pages.
Inquaero.com [online], "Fulfill GDPR Art. 17 ("Right to Erasure"): SAP ILM Simplified Blocking and Deletion", Jun. 12, 2018, retrieved on Jan. 27, 2024, retrieved from URL <https://www.inquaero.com/blog/ilm-simplified-blocking-deletion>, 17 pages.
SAP "SAP Asset Manager Security Guide" Dec. 10, 2020, 28 pages.
SAP "SAP Event Stream Processor: Security Guide" Sep. 23, 2019, 58 pages.

* cited by examiner

Application Registration 608

| Application 602 | Obj. Type 604 | Repr. By 606 | Can Be Requester? | Can Do EoP Check? 610 | Can Block? 612 | Can Add Synonymous Keys? 614 |
|---|---|---|---|---|---|---|
| App 1 | Business Partner | | Yes | Yes | Yes | Yes |
| App 5 | Business Partner | | Yes | Yes | Yes | Yes |
| App 2 | Business Partner | | Yes | Yes | Yes | No |
| App 3 | Business Partner | DRM | Yes | No | Yes | Yes |
| App 4 | Business Partner | DRM | No | No | Yes | No |
| App 6 | Business Partner | DRM | No | Yes | Yes | No |

FIG. 6

Representer Registration 708

| Representer 702 | Obj. Type 704 | Can Be Requester? | Can Do EoP Check? 710 | Can Block? 712 | Can Add Synonymous Keys? 714 |
|---|---|---|---|---|---|
| DRM | Business Partner | Yes | Yes | Yes | Yes |

FIG. 7

| Application 802 | Obj. Type 804 | Is Requester? 806 | Relevant for EoP? 808 | Relevant For Block? 810 | Responder Group Check 812 | Responder Group Block 814 | Allowed To add Synon. Keys? | Using Context 818 | Providing Context 820 |
|---|---|---|---|---|---|---|---|---|---|
| App 1 822 | Business Partner | No | Yes | Yes | 1 | 3 | yes 824 | | App 1 826 |
| App 5 830 | Business Partner | No | Yes | Yes | 2 | 2 | no | App 1 828 | |
| App 2 | Business Partner | Yes | No | Yes | | 2 | no | | |
| App 3 | Business Partner | No | No | Yes | | 1 | yes | | FGIDR |
| App 4 | Business Partner | No | No | Yes | | 1 | no | | |
| App 6 | Business Partner | No | Yes | Yes | 2 | 1 | no | FGIDR | |

MULTIPLE SYNONYMOUS IDENTIFIERS IN DATA PRIVACY INTEGRATION PROTOCOLS

TECHNICAL FIELD

The present disclosure relates to computer-implemented methods, software, and systems for using multiple synonymous identifiers in data privacy integration protocols.

BACKGROUND

Applications used for organizations can use master data (such as name and address) and transactional data (such as orders and bills). Transactional data typically references corresponding master data. For instance, a transactional object of type Order can refer to a master data object of type Customer. A given master data object can be referenced by one or more (or perhaps no) transactional objects. In some cases, data may be considered master data in one context and transactional data in another context. For example, insurance contract data may be considered transactional data with respect to a customer object but considered master data with respect to transactional insurance claim data. When an organizational landscape includes multiple systems, a master data replication process can be performed so that master data objects are consistent across systems.

SUMMARY

The present disclosure involves systems, software, and computer implemented methods for using multiple synonymous identifiers in data privacy integration protocols. An example method includes: identifying a request to initiate a data privacy integration protocol in a multiple-application landscape for an object with a first identifier; determining that at least one context-using application participant of the data privacy integration protocol relies on a context-providing application participant of the data privacy integration protocol for resolving the first identifier to a local identifier local to a context of the context-providing application participant; sending a resolution request to each context-providing application participant that can provide resolution for at least one context-using application; receiving, from each context-providing application participant in response to the resolution request, a local identifier corresponding to the first identifier that is local to the context of the context-providing application participant; sending a first data privacy integration protocol work package that includes the local identifier to each context-using application participant; receiving a first data privacy integration protocol response from each context-using application participant that includes a result of a respective context-using participant executing the first data privacy integration protocol work package using the local identifier; sending a second data privacy integration protocol work package that includes the first identifier to each protocol application participant other than context-using application participants; receiving a second data privacy integration protocol response from each non-context-using application participant that includes a result of a respective non-context-using participant executing the second data privacy integration protocol work package using the first identifier; and determining a data privacy integration protocol result based on evaluating first data privacy integration protocol responses received from context-using application participants and second data privacy integration protocol responses received from non-context-using application participants.

Implementations can include one or more of the following features. The data privacy integration protocol can be an integrated end of purpose protocol and the request can be to determine whether the object can be blocked. The data privacy integration protocol can be an aligned purpose disassociation protocol and the request can be to determine whether a purpose can be disassociated from the object. The data privacy integration protocol can be an integrated personal data retrieval protocol, the object can correspond to a data subject, and the request can be to gather data concerning the data subject. A first context-using application participant can understand the local identifier of a first context-providing protocol participant. The first context-providing protocol participant can replicate data including an object with the local identifier to the first context-using protocol participant. The first identifier can be a common identifier understood by multiple applications of the multiple-application landscape. The common identifier can be assigned to the object by an object redistribution service. The object redistribution service can be a master data integration service. The first identifier can be received in a request from a requester that initiates the data privacy integration protocol. An initial request from a requester can include a second identifier different from the first identifier. A second resolution request can be sent to a first context-providing application participant to resolve the second identifier to a common identifier understood by multiple applications of the multiple-application landscape. The common identifier can be received as the first identifier in response to the second resolution request. The initial request can be modified to include the first identifier rather than the second identifier. A second request can be received that includes a second identifier from a first context-using application. A second resolution request can be sent to a first context-providing application to resolve the second identifier to a local identifier and the local identifier can be provided in a third data privacy integration work package to a second context-using application. A second local identifier corresponding to the first identifier that is local to a second context understood by the context-providing application participant can be received from a first context-providing application participant in response to the resolution request, along with the local identifier.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 6 illustrates an example application registration table.

FIG. 7 illustrates an example representer registration table.

FIG. 8 illustrates an example application configuration table.

DETAILED DESCRIPTION

Figure 1:
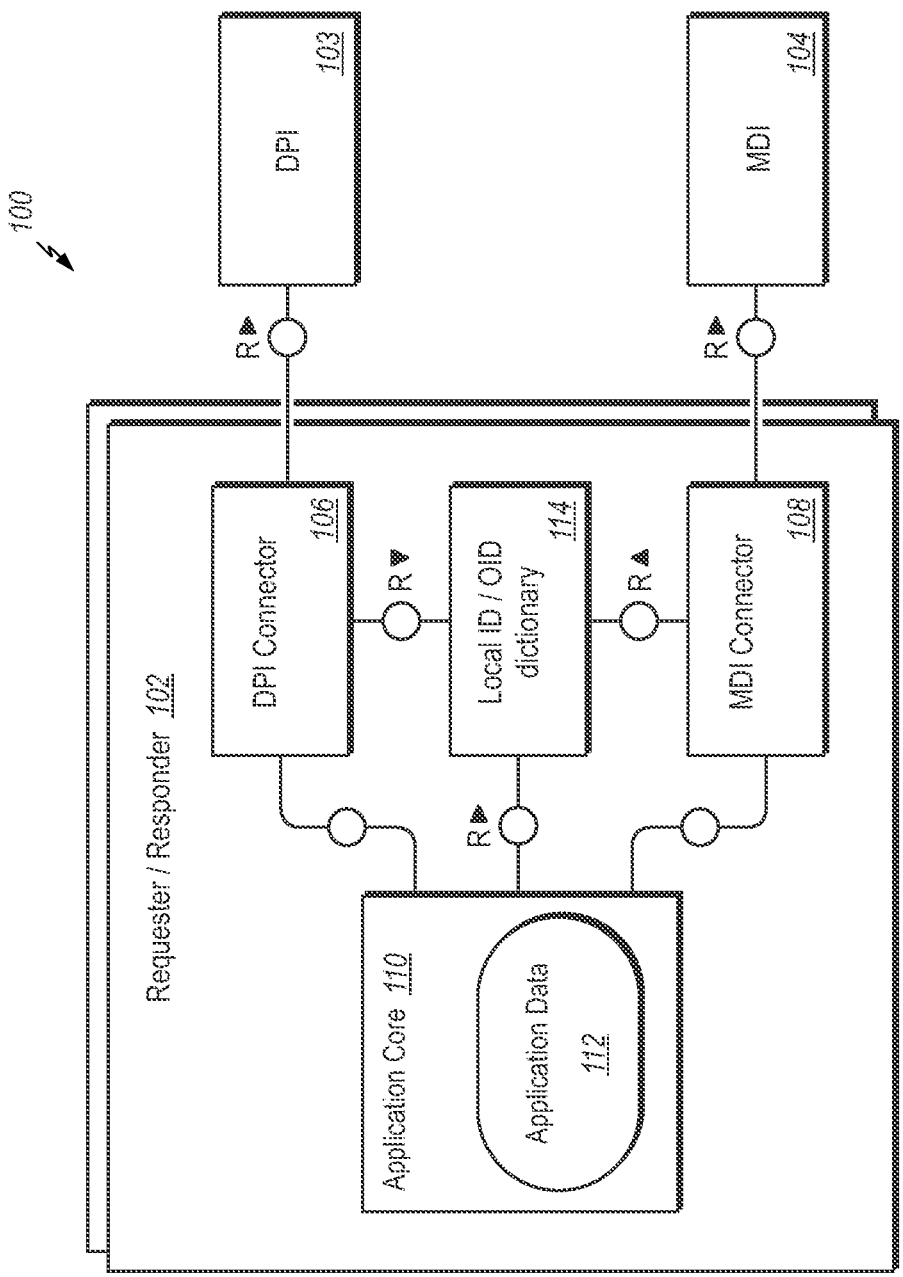
FIG. 1 illustrates an example system for a data privacy integration protocol participant.

As described below, different scenarios can exist regarding understanding of object identifiers in a multiple-application landscape that includes integrated applications. As described in more detail below, an approach of using synonymous keys where a context-providing application resolves an identifier not understood by a context-using application to an identifier understood by the context-using application. The context-using application may use, share, or otherwise understand local identifiers that are local to the context-providing application, for example. By resolving identifiers, data privacy integration protocols can be performed with different types of application participants. For instance, with synonymous keys, it can be possible to run data privacy protocols in legacy landscapes, such as landscapes where not all applications are able to understand objects identified by a common object domain, for example. Use of synonymous keys can be implemented using fewer component dependencies than other approaches (as described below), which can reduce occurrences of protocol failure, reduce implementation complexities, and reduce points of contact for security issues.

In general, an integrated multiple-application landscape can include a data privacy integration (DPI) service that provides various functions for integrating personal data related capabilities of different applications. For example, the DPI service can include protocols related to integrated end-of-purpose processing, integrated personal data retrieval, aligned purpose disassociation, and other protocols. An integrated end-of-purpose protocol (iEoP) can be used to align different applications on a point in time when personal data should be blocked. An integrated personal data retrieval protocol (iPDR) can be used to manage receiving exports of personal data from various applications, so that a common report including personal data concerning a same data subject from multiple applications can be generated. An aligned purpose disassociation protocol (APD) can be used to align various applications when a purpose assignment is removed from a data object. The various DPI protocols can be used in on-premise and/or cloud environments, and can be designed as asynchronous protocols using asynchronous communication between the DPI service and the various applications.

Example integrated end-of-purpose, integrated personal data retrieval, and aligned purpose disassociation protocols are described in more detail in U.S. patent application Ser. No. 17/457,797, filed on Dec. 6, 2021 entitled "INTEGRATED END-OF-PURPOSE PROTOCOL FOR MULTIPLE APPLICATIONS", U.S. patent application Ser. No. 17/457,811, filed on Dec. 6, 2021 entitled "INTEGRATED PERSONAL DATA RETRIEVAL ACROSS MULTIPLE APPLICATIONS", and U.S. patent application Ser. No. 17/457,802, filed on Dec. 6, 2021 entitled "ALIGNED PURPOSE DISASSOCIATION PROTOCOL FOR MULTIPLE APPLICATIONS", respectively, the entire contents of each which are hereby incorporated by reference.

Each application in the landscape can have its own persistency (e.g., database). However, some master data may be needed in more than one application. A MDI (Master Data Integration) service can be used to replicate master data between applications. For data privacy integration protocols, different applications can participate in processes involving one or more objects. For example, data privacy integration protocols can involve an object that may be blocked, an object that may be disassociated from a purpose, or an object that represents a data subject for which data is to be gathered in response to a request. Each data privacy integration protocol, therefore, may depend on every object being clearly identifiable by a unique identifier. In some cases, each application may be integrated with the MDI service and a DPI service and object identifiers used for DPI protocols may each be global object identifiers that are recognizable by each application (e.g., either within a landscape or across landscape). Global identifiers may be unique across landscapes, for example, if the identifiers are long enough and certain unique namespaces are used. In some implementations, the global identifiers are referred to as OIDs (e.g., One Domain Model identifiers, as part of a global domain). In the iEoP protocol, for example, a requester can initiate the protocol for a list of master data objects that are each identified by a respective OID. Each responder application participating in the protocol may be able to identify each object based on a respective OID.

FIG. 1 illustrates an example system 100 for a data privacy integration protocol participant. The system 100 includes a protocol participant 102 (who may participate, for example, as a requester and/or as a responder), a DPI service 103, and a MDI service 104. The participant 102 can interface with the DPI service 103 using a DPI connector 106. The participant can interface with the MDI service 104 using a MDI connector 108. The participant 102 can have an application core component 110 that includes application data 112. To participate in DPI protocols in which objects are expressed as OIDs, the participant can use a local dictionary 114 that maps a local identifier (e.g., of an object in the application data 112 to a corresponding OID).

As an example, the participant may be a human resources application and the application data 112 may include employee objects that are locally identified in the participant 102, for example, by an employee number generated by the application core component 110. Another example of a local identifier that is specific to the participant 102 may be a 10-digit customer number. Other protocol participants may not be aware of or configured to use employee numbers or 10-digit customer numbers. Applications may use different local identifiers in cross line-of-business and/or cross-vendor situations, for example. The MDI service 104 can assign an OID understandable by other applications to each employee object or customer object, and the local dictionary 114 can map an OID of an employee object or a customer object to a corresponding employee number or customer number used by the application core component 110, respectively.

The participant 102 can use the local dictionary 114 to obtain an OID to include when submitting a request to the DPI service 103 as a requester. As another example, the participant 102 can use the local dictionary 114 to determine a local identifier when receiving a request with an OID as a responder. Accordingly, use of OIDs can enable different applications to identify objects, even when each application uses different local identifiers. However, in some landscapes, problems can occur when an application in the landscape is not capable of handling OIDs. An application might not be integrated with the MDI service 104 or may be integrated with other middleware that does not support OIDs. In this example, an OID may no longer be a "global" identifier understood by all applications, although multiple (but not all) applications may be able to understand the OID. As such, the OID may be referred to as a "common" identifier still understood by multiple applications).

Figure 2:
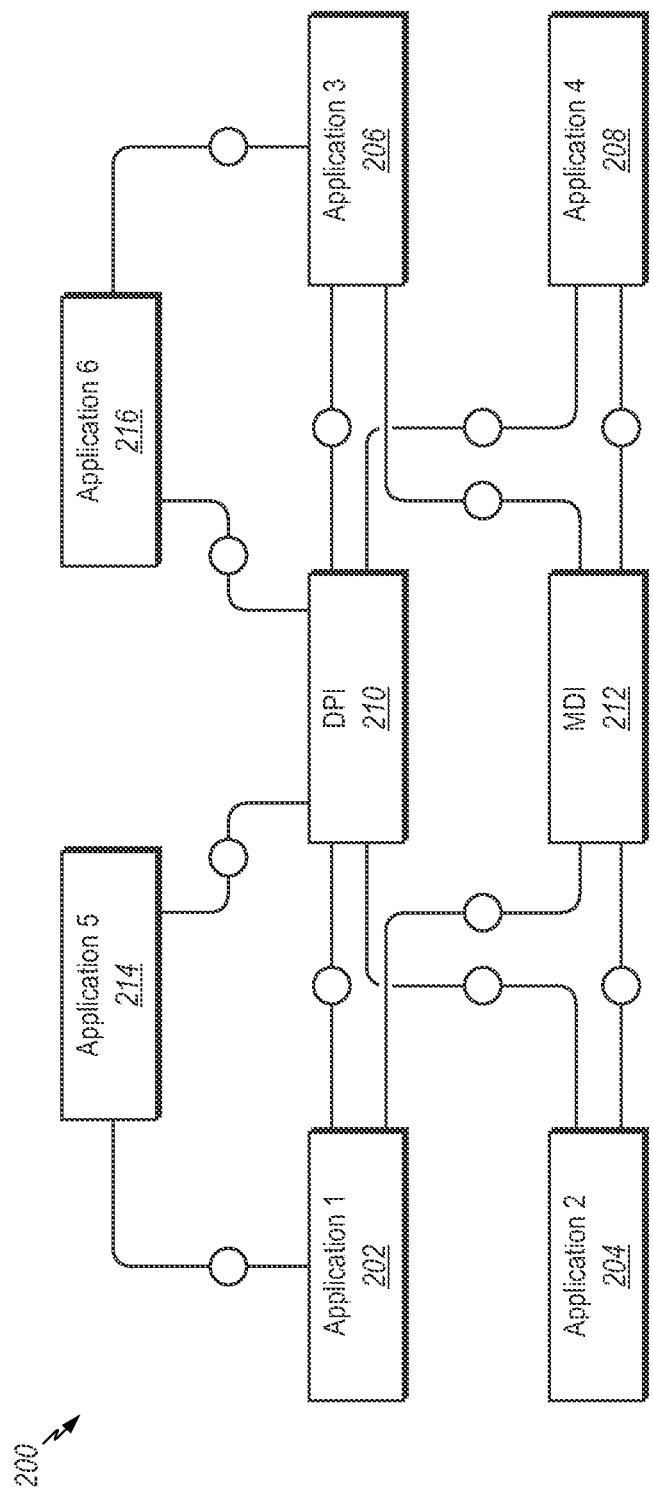
FIG. 2 illustrates an example system in which not all applications are integrated with a master data integration service.

FIG. 2 illustrates an example system 200 in which not all applications are integrated with a master data integration service. In the system 200, a first application 202, a second application 204, a third application 206, and a fourth application 208 are each integrated with both a DPI service 210 and a MDI service 212. However, a fifth application 214 and a sixth application 216 are each integrated with the DPI service 210, but not the MDI service 212.

The fifth application 214 is connected to the first application 202 using, for example, point-to-point integration. Similarly, the sixth application 216 is connected to the third application 206 using point-to-point integration. Data can be replicated from the first application 202 to the fifth application 214 and from the third application 206 to the sixth application 216. However, neither the fifth application 214 nor the sixth application 216, although DPI participants, are capable of understanding meaning of OIDs that are assigned by the MDI service 212, and that are available to the other applications. Landscape architectures such as shown in the system 200 may be common. For successful implementation of DPI protocols, different solutions can be employed so that, for example, the fifth application 214 and the sixth application 216 can participate in DPI protocols even though as initially configured the applications are not able to identify objects in DPI communications that have a common OID. Different potential solutions can have various disadvantages, however.

Figure 3:
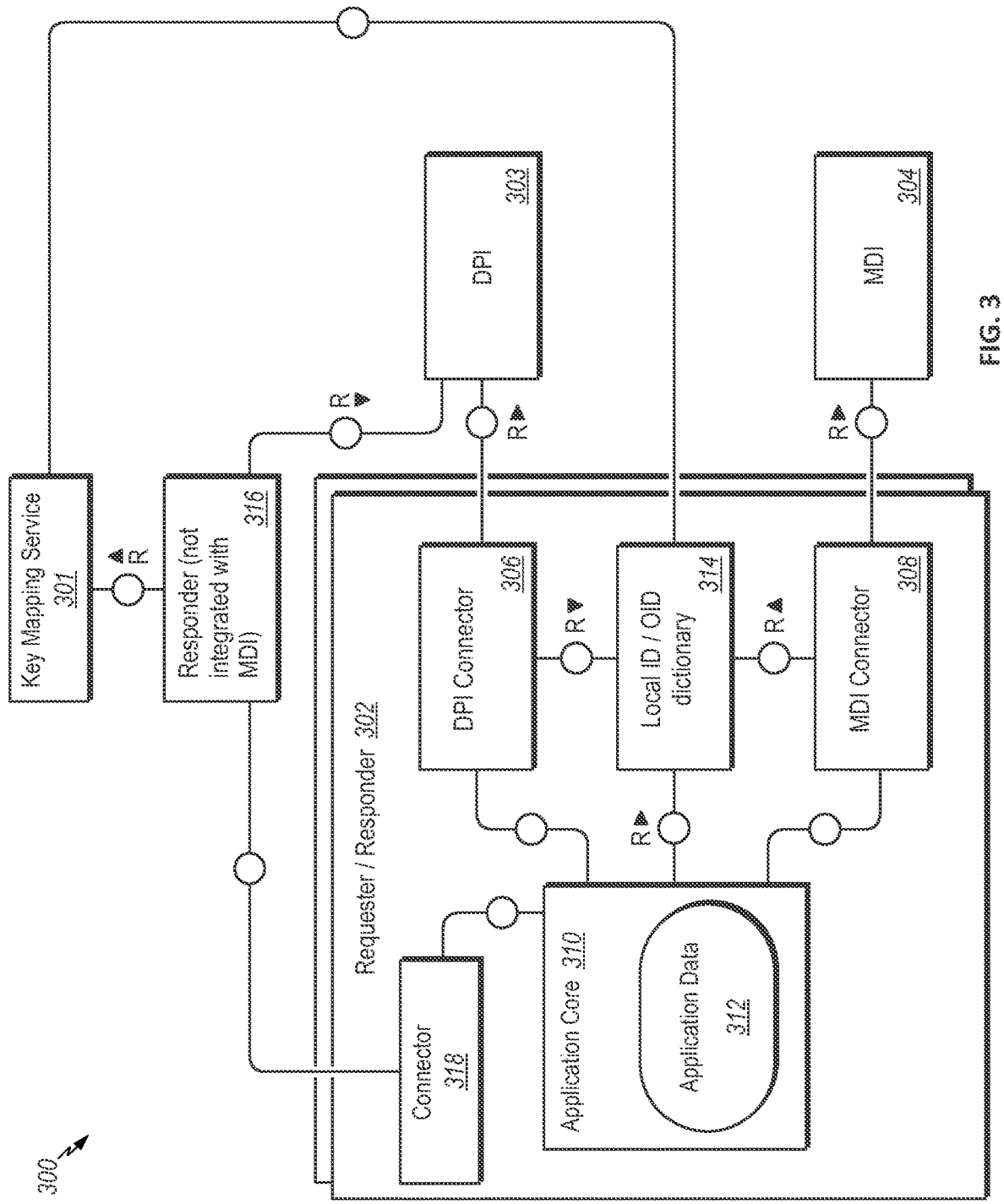
FIG. 3 illustrates an example system that uses a key mapping service.

FIG. 3 illustrates an example system 300 that uses a key mapping service 301. A DPI protocol participant 302 corresponds to the protocol participant 102 described above with respect to FIG. 1. For example, the protocol participant 302 interfaces with a DPI service 303 using a DPI connector 306 and with an MDI service 304 using a MDI connector 308. The participant 302 includes an application core component 310 that includes application data 312. The protocol participant 302 can, based on integrating with the MDI service 304, maintain a local dictionary 314 that maps local identifiers to OIDs assigned by the MDI service 304.

A protocol responder 316 is integrated with the protocol participant 302 via a connector 318, but is not integrated with the MDI service 304. The protocol participant 302 and the protocol responder 316 can correspond to the first application 202 and the fifth application 214 described above with respect to FIG. 2, for example. The protocol responder 316 can receive objects from the protocol participant 302, using the connector 318, when the protocol responder 316 is to participate in a DPI protocol managed by the DPI service 303.

The protocol responder 316 can send a request to the key mapping service 301 to obtain a common OID that corresponds to a local identifier that was received from the protocol participant 302. The key mapping service 301 can interface with the local dictionary 314 to retrieve mapping information between local identifiers of the protocol participant and corresponding OIDs (e.g., either on demand for a particular request or to periodically update a mapping stored in the key mapping service 301). The key mapping service 301 can provide a common OID to the protocol responder 316 in response to a request from the protocol responder 316.

The key mapping approach shown in FIG. 3 has several disadvantages, however. The system 300 introduces additional dependencies for the protocol responder 316, for example. The protocol responder 316 has a dependency on the key mapping service 301, which can influence the availability of the protocol responder 316 as a participant in DPI protocols. For instance, if the key mapping service 301 is not available, the protocol responder 316 cannot participate in a DPI protocol. For the iEoP protocol and the APD protocol, for example, one system such as the protocol responder 316 being unavailable can result in protocol runs not being able to be completed. This is because the protocol responder 316 cannot vote (or otherwise participate) in the protocol if the protocol responder 316 cannot receive an object identifier translation from the key mapping service 301.

As another example, the key mapping service 301 might not be able to successfully respond to a request from the protocol responder 316 if there is an issue with the integration between the key mapping service 301 and the protocol participant 302. For example, in implementations in which the protocol participant 302 pushes mappings from the local dictionary 314 to the key mapping service 301, issues may arise that cause the key mapping service 301 to not have mapping information for an object at a time the protocol responder 316 requests a mapping. For example, the protocol responder 316 may request a mapping from the key mapping service 301 before a mapping is pushed by the protocol participant 302 to the key mapping service 301. As another example, there may be other types of communication or configuration issues that prevent new or updated mapping from being sent to the key mapping service 301 by the protocol participant 302. As another example, when the key mapping service 301 requests a mapping from the local dictionary 314 on demand in response to a request for a mapping from the protocol responder 316, the protocol participant might not be responsive, which can result in the key mapping service 301 not being able to service the request from the protocol responder 316. As such, the availability of the key mapping service 301 can be affected by different types of dependencies that the key mapping service 301 has on the protocol participant 302.

Another disadvantage of the system 300 is that the addition of the key mapping service 301 introduces security risks. For example, the key mapping service 301 may include a bug in code that provides mappings, so that a responder may accidentally delete incorrect objects. As another example of security risk, the addition of the key mapping service 301 as another component adds an avenue by which a hacker may access and modify the system. For example, a hacker may modify the key mapping service 301 with malicious code so that wrong key mappings are provided. The key mapping service 301 can be configured with adequate security, but in general, the introduction of another component can result in an overall increase in security risk.

The system 300 can include other disadvantages. For instance, from a perspective of the DPI service 303, the protocol responder 316 may appear to be able to identify objects by OIDs. The DPI service 303 may not be aware that the protocol responder 316 uses the key mapping service 301, for example. Accordingly, troubleshooting issues with DPI protocols may be more challenging, especially issues that may involve the use of the key mapping service 301 by the protocol responder 316, because a troubleshooter (e.g., an administrator associated with the DPI service 303) may not be aware of essentially background use of the key mapping service 301 by the protocol responder.

Figure 4:
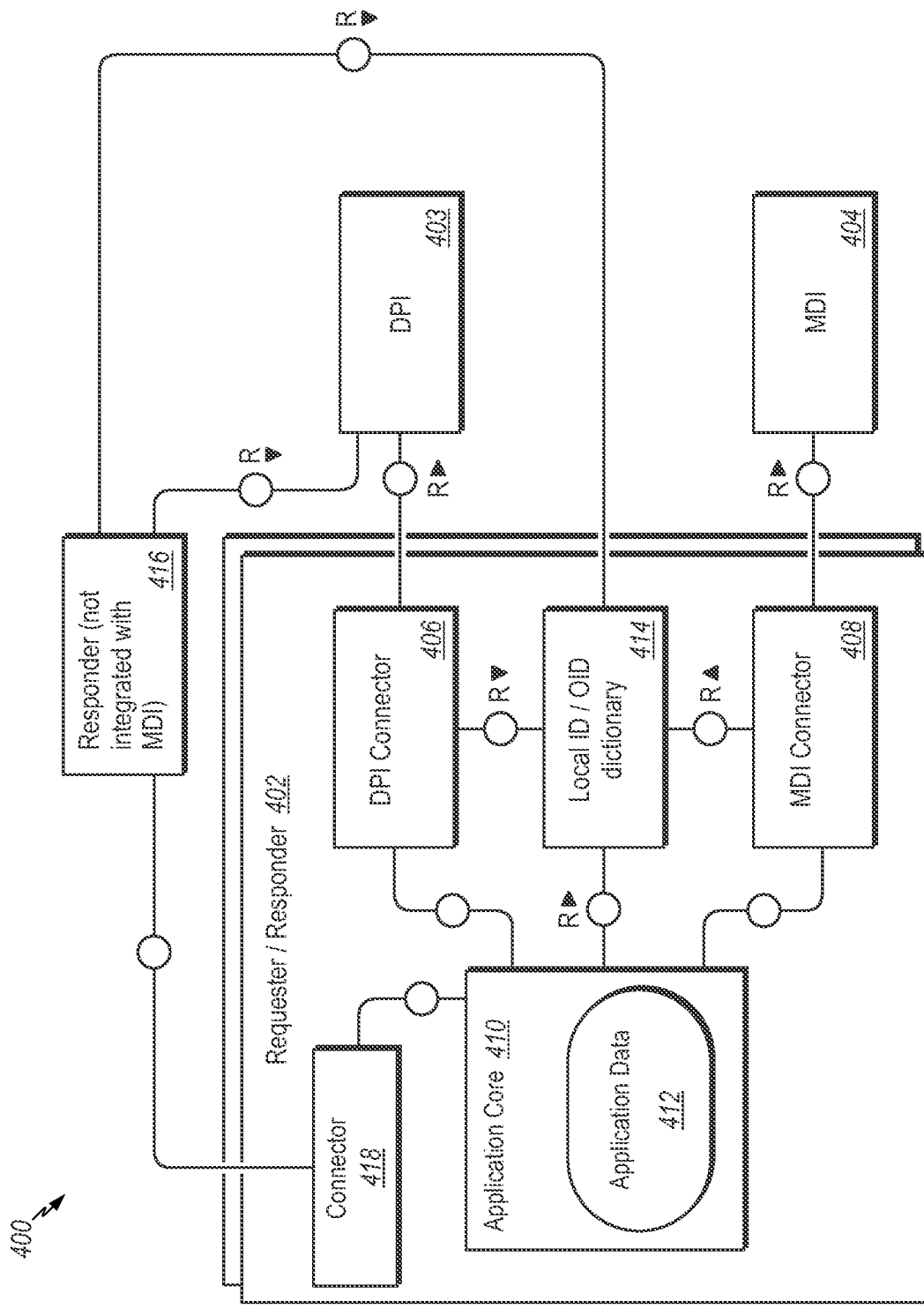
FIG. 4 illustrates a system that includes integration between two protocol participants.

FIG. 4 illustrates a system 400 that includes integration between two protocol participants. A protocol participant 402 is similar to the protocol participant 302 described above with respect to FIG. 3. For example, the protocol participant 402 interfaces with a DPI service 403 using a DPI connector 406 and with an MDI service 404 using a MDI connector 408. The participant 402 includes an application core component 410 that includes application data 412. The protocol participant 402 can, based on integrating with the MDI service 404, maintain a local dictionary 414 that maps local identifiers to OIDs assigned by the MDI service 404. The protocol participant 402 can communicate with a protocol responder 416 that is not connected with the MDI service 404 using a connector 418.

The protocol responder 416 can, instead of using a key mapping service, send object mapping requests to the protocol participant 402 using the connector 418. However, some of the same disadvantages mentioned above apply to the participation of the protocol responder 416 in data privacy integration protocols. For example, the protocol responder 416 is now dependent on the protocol participant 402. If the protocol participant 402 is not available, the protocol responder 416 also becomes unavailable for protocol participation. As another example, the protocol responder 416 also appears, from the perspective of the DPI service 403, to understand common identifiers assigned by the MDI service 404, which can make troubleshooting more challenging, as described above, since the DPI service is not aware of how, internally, the protocol responder 416 becomes aware of common identifiers.

Figure 5:
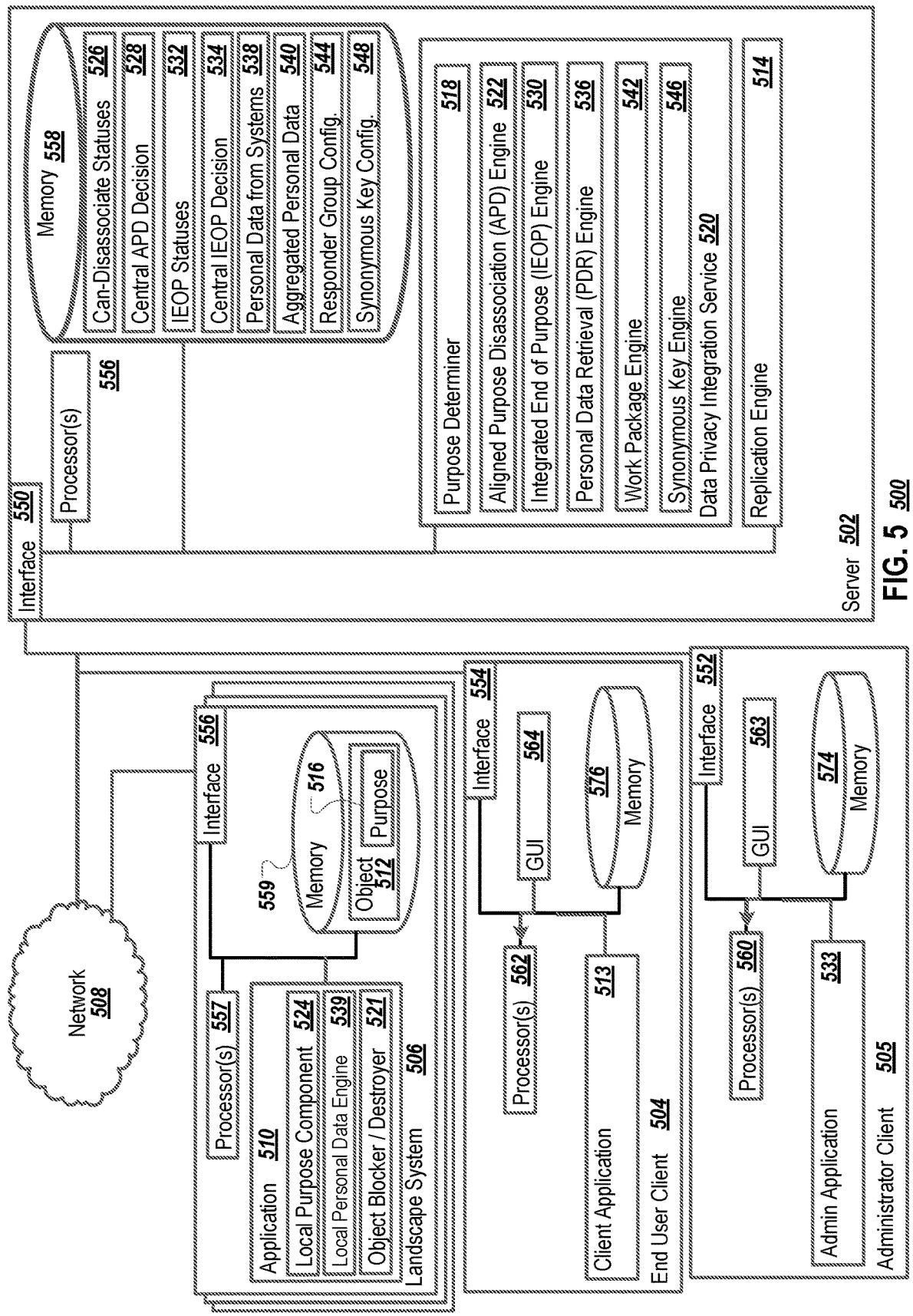
FIG. 5 is a block diagram illustrating an example system for using multiple synonymous identifiers in data privacy integration protocols.

FIG. 5 is a block diagram illustrating an example system 500 for using multiple synonymous identifiers in data privacy integration protocols. Specifically, the illustrated system 500 includes or is communicably coupled with a server 502, an end-user client device 504, an administrator client device 505, landscape systems 506, and a network 508. Although shown separately, in some implementations, functionality of two or more systems or servers may be provided by a single system or server. In some implementations, the functionality of one illustrated system, server, or component may be provided by multiple systems, servers, or components, respectively. For example, the server 502 includes different engines which may or may not be provided by a single system or server.

The landscape systems 506 can include multiple systems that exist in a multi-system landscape. An organization can use different systems of different types to run the organization, for example. The landscape systems 506 can include systems from a same vendor or different vendors. The landscape systems 506 can each include at least one application 510 for performing organizational processes and working with organizational data. Organizational data can include master data objects and transactional objects. For example, the application 510 can process a master data object 512. An end user can use a client application 513 (which may be a client version of the application 510) on the end-user client device 504 to view and interact with landscape data, including information from the master data object 512. Regarding the handling of master data objects, various best practices can be applied by an organization. For example, the system 500 can be configured so that corresponding master data objects are consistent across all landscape systems 506. For instance, a replication engine 514 can distribute master data across the landscape systems 506 so that each application 510 can perform processing on the same consistent master data. The replication engine 514 can be a MDI service, for example.

Various data protection rules and laws may require that data is only processed for legitimate specified purposes. The system 500 can implement a purpose requirement by associating purpose information with each object instance. For example, a purpose 516 has been associated with the master data object 512. A purpose determiner 518 included in a DPI service 520 can determine appropriate purposes for an object and associate the purposes with the object. The landscape system 506 can receive the master data object 512 and the associated purpose 516 from the replication engine 514, for example. The purpose determiner 518 can also determine which applications process objects for which purposes. The replication engine 514 can replicate an object with an assigned purpose to a given landscape system 506 when the landscape system 506 processes objects for that purpose.

Objects that no longer have any associated purposes can be put into a blocked state for a period of time, for instance by an object blocker/destroyer 521, before being deleted. For instance, while an object instance with no attached purposes may no longer be used for transactions or have any need to be accessed by production systems, the object can be maintained, in a blocked state, for a certain number of days or years, to enable auditing, for example. An authorized service, such as an audit service, may be enabled to access the blocked object, but other production applications or services can be prevented from accessing the blocked object.

As part of an aligned disassociation approach, the landscape systems 506 can disassociate a purpose with an object in response to information received from an aligned purpose disassociation engine 522 of the DPI service 520, rather than solely based on a local decision. For example, each landscape system 506 can provide information to the aligned purpose disassociation engine 522. For example, a local purpose component 524 in each landscape system 506 can determine locally (e.g., without consulting other systems), for each purpose of an object, whether the purpose can be locally disassociated from the object. For example, each landscape system 506 can determine a "can-disassociate" status for a requested purpose and object. A can-disassociate status for a respective landscape system 506 can be either an affirmative can-disassociate status that indicates that the landscape system 506 can disassociate a purpose from an object or a negative can-disassociate status that indicates that the landscape system 506 cannot disassociate the purpose from the object. The aligned purpose disassociation engine 522 can collect received can-disassociate statuses 526. The aligned purpose disassociation engine 522 can evaluate the can-disassociate statuses 526 to determine a central aligned disassociate purpose decision 528 regarding disassociating a purpose from an object. The aligned purpose disassociation engine 522 can determine that the central aligned disassociate purpose decision 528 is to disassociate the purpose from the object if no landscape system 506 is unable to disassociate the purpose from the object. The aligned purpose disassociation engine 522 can determine that the central aligned disassociate purpose decision 528 is to not disassociate the purpose from the object if at least one landscape system 506 is unable to disassociate the purpose from the object. The aligned purpose disassociation engine 522 can provide the central aligned disassociate purpose decision 528 to each landscape system 506. The local purpose component 524 can disassociate the purpose from the object in response to receiving the central aligned disassociate purpose decision 528, if the central aligned disassociate purpose decision 528 is in fact to disassociate the purpose from the object.

The object blocker/destroyer 521 can block an object (e.g., from all production processing) when no purposes are associated with the object (e.g., after all purposes have been disassociated), according to one or more retention policies. An object can be blocked, rather than destroyed, if one or more retention policies state that the object is to be maintained for access, outside of productive processing, only by authorized users. The object blocker/destroyer 521 can determine to destroy a blocked object in response to determining that all applicable retention reasons have expired. Object destruction decisions and actions can occur locally and independently in each landscape system 506. For example, each application 510 can determine locally whether a blocked object is to be destroyed. For instance, the application 510 can determine to destroy an object when no purposes are associated with the object, no transactional data references the object, and no retention policy currently applies to the object. In response to an object destruction decision, the object blocker/destroyer 521 can destroy the object.

In some implementations, an iEoP (Integrated End of Purpose) engine 530 of the DPI service 520 is used instead of or in addition to the APD engine 522. The iEoP engine 530 can send EoP queries to each landscape system 506 and receive EoP statuses 532 from the local purpose components 524 of different landscape systems regarding ability to delete a particular master data object. The iEoP engine 530 can evaluate the EoP statuses 532 to generate a central EOP decision 534. If a consensus is reached regarding ability to block an object, the iEoP engine 530 can distribute aligned block commands to trigger an aligned blocking of the object across the landscape systems 506. The iEoP engine 530 can also orchestrate integrated unblocking, when unblocking is required due to blocking failure in one or more systems, or for other reasons.

A data subject can have a right to request personal data stored about the data subject. The data subject can initiate a personal data request from any of the landscape systems 506. For example, the data subject may submit a request using a user interface of the client application 513, with the request being received by the application 510 that handles requests from the client application 513. The application 510 can forward the request to a personal data retrieval engine 536 of the DPI service 520. Accordingly, any application within the landscape that is integrated with the DPI service 520 can request a report that, when generated, includes personal data automatically obtained by the DPI service from all of the other applications in the landscape. The data subject, therefore, can trigger a personal data request, in any one of the applications, rather than having to request from all of the applications. The PDR engine 536 automatically requests and receives personal data 538 from respective local personal data engines 539 in different landscape systems 506. The PDR engine 536 then creates aggregated personal data 540 and provides the aggregated personal data 540 to the data subject in response to the request, as a unified and uniform data report. In addition to the APD engine 522, the iEoP engine 530, and the PDR engine 536, the DPI service 520 can include or provide other data privacy integration services.

A work package engine 542 can be used to split requests into multiple work packages. The DPI service 520 can send requests (e.g., work packages) to applications according to responder group configurations 544. For example, applications can be grouped into responder groups, where the DPI service 520 asks applications in different responder groups, in turn, to respond to a request. Applications can be grouped according to a resource-reduction strategy. For example, applications that are more likely to provide a veto vote (e.g., cannot-block, cannot-disassociate purpose) can be put into earlier responder groups, to reduce a likelihood of other applications unnecessarily performing integrated end-of-purpose or aligned purpose disassociation processing, respectively. Other examples include putting applications that are more likely to fail a block application in earlier responder groups, or putting applications that are likely to expend more resources responding to a request in a later responder group.

A synonymous key engine 546 can handle situations where a DPI protocol run involves an object identifier that is not understood by all landscape systems 506. For example, for some landscapes, the replication engine 514 may assign common identifiers to objects but some landscape systems 506 may not be integrated with the replication engine 514. The synonymous key engine 546 can, based on synchronous key configuration data 548, determine that a first landscape system 506, which can be referred to as a context-providing landscape system (or application) can resolve an identifier, for a context-using landscape system/application, to a local identifier in a context of the context-providing application. The context-using landscape system/application can use, rely-on, and understand the context of the context-providing application, for example. Accordingly, before the DPI service 520 handles protocol requests, the DPI service 520 can invoke the synonymous key engine 546 to request resolution by context-providing applications/systems of identifiers to identifiers understood by any context-using applications that need to participate in the protocol. Accordingly, the protocol can be ran even for situations in which context-using applications may not have otherwise been able to identify objects included in a protocol request. Further details of synonymous keys, context-providing applications, and context-using applications are discussed in FIGS. 6-10 below.

As used in the present disclosure, the term "computer" is intended to encompass any suitable processing device. For example, although FIG. 5 illustrates a single server 502, a single end-user client device 504, a single administrator client device 505, the system 500 can be implemented using a single, stand-alone computing device, two or more servers 502, or multiple client devices. Indeed, the server 502 and the client devices 504 and 505 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 502 and the client devices 504 and 505 may be adapted to execute any operating system or runtime environment, including Linux, UNIX, Windows, Mac OS®, Java™, Android™, iOS, BSD (Berkeley Software Distribution) or any other suitable operating system. According to one implementation, the server 502 may also include or be communicably coupled with an e-mail server, a Web server, a caching server, a streaming data server, and/or other suitable server.

Interfaces 550, 552, 553, and 554 are used by the server 502, the end-user client device 504, the landscape system 506, and the administrator client device 505, respectively, for communicating with other systems in a distributed environment—including within the system 500—connected to the network 508. Generally, the interfaces 550, 552, 553, and 554 each comprise logic encoded in software and/or hardware in a suitable combination and operable to communicate with the network 508. More specifically, the interfaces 550, 552, 553, and 554 may each comprise software supporting one or more communication protocols associated with communications such that the network 508 or interface's hardware is operable to communicate physical signals within and outside of the illustrated system 500.

The server 502 includes one or more processors 556. Each processor 556 may be a central processing unit (CPU), a blade, an application specific integrated circuit (ASIC), a field-programmable gate array (FPGA), or another suitable component. Generally, each processor 556 executes instructions and manipulates data to perform the operations of the server 502. Specifically, each processor 556 executes the functionality required to receive and respond to requests from the end-user client device 504, for example. Similarly, each landscape system 506 includes one or more processors 557. Each processor 557. Each processor 557 executes instructions and manipulates data to perform the operations of the respective landscape system 506.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, ABAP (Advanced Business Application Programming), ABAP 00 (Object Oriented), any suitable version of 4GL, as well as others. While portions of the software illustrated in FIG. 5 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 502 includes memory 558. In some implementations, the server 502 includes multiple memories. The memory 558 may include any type of memory or database module and may take the form of volatile and/or non-volatile memory including, without limitation, magnetic media, optical media, random access memory (RAM), read-only memory (ROM), removable media, or any other suitable local or remote memory component. The memory 558 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 502. Similarly, each landscape system 506 includes memory 559. The memory 559 may store various objects or data associated with the purposes of the landscape system 506.

The end-user client device 504 and the administrator client device 505 may each be any computing device operable to connect to or communicate in the network(s) 508 using a wireline or wireless connection. In general, each of the end-user client device 504 and the administrator client device 505 comprises an electronic computer device operable to receive, transmit, process, and store any appropriate data associated with the system 500 of FIG. 5. Each of the end-user client device 504 and the administrator client device 505 can include one or more client applications, including the client application 513 or an administrative application 533, respectively. A client application is any type of application that allows a client device to request and view content on the client device. In some implementations, a client application can use parameters, metadata, and other information received at launch to access a particular set of data from the server 502. In some instances, a client application may be an agent or client-side version of the one or more enterprise applications running on an enterprise server (not shown).

The client device 504 and the administrator client device 505 respectively include processor(s) 560 or processor(s) 562. Each processor 560 or 562 included in the end-user client device 504 or the administrator client device 505 may be a central processing unit (CPU), an application specific integrated circuit (ASIC), a field-programmable gate array (FPGA), or another suitable component. Generally, each processor 560 or 562 included in the end-user client device 504 or the administrator client device 505 executes instructions and manipulates data to perform the operations of the end-user client device 504 or the administrator client device 505, respectively. Specifically, each processor 560 or 562 included in the end-user client device 504 or the administrator client device 505 executes the functionality required to send requests to the server 502 and to receive and process responses from the server 502.

Each of the end-user client device 504 and the administrator client device 505 is generally intended to encompass any client computing device such as a laptop/notebook computer, wireless data port, smart phone, personal data assistant (PDA), tablet computing device, one or more processors within these devices, or any other suitable processing device. For example, the end-user client device 504 and/or the administrator client device 505 may comprise a computer that includes an input device, such as a keypad, touch screen, or other device that can accept user information, and an output device that conveys information associated with the operation of the server 502, or the client device itself, including digital data, visual information, or a GUI 563 or a GUI 564, respectively.

The GUI 563 and the GUI 564 each interface with at least a portion of the system 500 for any suitable purpose, including generating a visual representation of the client application 513 or the administrative application 533, respectively. In particular, the GUI 563 and the GUI 564 may each be used to view and navigate various Web pages. Generally, the GUI 563 and the GUI 564 each provide the user with an efficient and user-friendly presentation of business data provided by or communicated within the system. The GUI 563 and the GUI 564 may each comprise a plurality of customizable frames or views having interactive fields, pull-down lists, and buttons operated by the user. The GUI 563 and the GUI 564 each contemplate any suitable graphical user interface, such as a combination of a generic web browser, intelligent engine, and command line interface (CLI) that processes information and efficiently presents the results to the user visually.

Memory 574 and memory 576 respectively included in the end-user client device 504 or the administrator client device 505 may each include any memory or database module and may take the form of volatile or non-volatile memory including, without limitation, magnetic media, optical media, random access memory (RAM), read-only memory (ROM), removable media, or any other suitable local or remote memory component. The memory 574 and the memory 576 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective client device.

There may be any number of end-user client devices 504 and administrative client devices 505 associated with, or external to, the system 500. Additionally, there may also be one or more additional client devices external to the illustrated portion of system 500 that are capable of interacting with the system 500 via the network(s) 508. Further, the term "client," "client device," and "user" may be used interchangeably as appropriate without departing from the scope of this disclosure. Moreover, while client device may be described in terms of being used by a single user, this disclosure contemplates that many users may use one computer, or that one user may use multiple computers.

FIG. 6 illustrates an example application registration table 600. The application registration table 600 can be used to register an application for an object type for a data privacy integration protocol. In this example, the application registration table 600 is used to register object types for applications for the iEoP protocol, however, similar tables can be used for other protocols.

For each application and object type configured in the application registration table 600, the application registration table 600 can include an application identifier 602, an object type 604, an optional represented-by configuration 606, a requester ability flag 608, an EoP check ability flag 610, a block ability flag 612, and a synonymous keys ability flag 614. The requestor ability flag 608 can indicate whether an application is capable of (e.g., has implemented functionality for) being a DPI protocol requester. The EoP check ability flag 610 and the block ability flag 612 can indicate whether an application is capable of performing an EoP check or participating in a block phase, respectively.

The synonymous keys ability flag 614 can indicate whether an application has implemented functionality for participating in synonymous keys functionality. For example, applications 616, 618, and 620 have each been registered as being able to add synonymous keys for a Business Partner object type. Use of synonymous keys is described in more detail below.

In some implementations and for some applications, the represented-by configuration 606 can include, for an application, another application that represents (e.g., acts on behalf of) the application, with respect to the DPI protocol. For example, the application 620 and applications 622 and 624 each have a configuration of "DRM" for the represented-by configuration 606, indicating that a DRM (Data Retention Manager) application responds to protocol requests (e.g., EoP checks) on behalf of those applications.

FIG. 7 illustrates an example representer registration table 700. The table 700 can be used to register representer applications that perform actions on behalf of other applications for a DPI protocol. The representer registration table 700 can be used to register a representer for an object type for a data privacy integration protocol. In this example, the representer registration table 700 is used to register object types for applications for the iEoP protocol but similar tables can be used for other protocols. For example, a DRM application 701 is registered as a representer for Business Partner objects. The DRM application 701 is referenced in the application registration table 600 in respective represented-by configurations, as discussed above.

For each representer and object type configured in the representer registration table, the representer registration table 700 can include a representer identifier 702, an object type 704, a requester ability flag 708, an EoP check ability flag 710, a block ability flag 712, and a synonymous keys ability flag 714. The object type 704, the requester ability flag 708, the EoP check ability flag 710, the block ability flag 712, and the synonymous keys ability flag 714 can have a same meaning for a representer as for corresponding fields for an application in the application registration table 600.

FIG. 8 illustrates an example application configuration table 800. The application configuration table 800 can be used to provide further configuration information (e.g., beyond registration) for an object type for an application for a data privacy integration protocol. In this example, the application configuration table 800 is used to configure object types for applications for the iEoP protocol but similar tables can be used for other protocols. An administrator can provide information for the application configuration table 800, including indicating which functionalities, among functionalities that an application is technically able to perform, that the administrator activates or authorizes for current use in the system.

For example, for each application and object type configured in the application configuration table 800, the application configuration table 800 can include an application identifier 802, an object type 704, an is-requestor flag 806, an EoP relevancy flag 808, a block relevancy flag 810, a responder group block configuration 812, a responder group check configuration 814, a synonymous keys flag 816, a using-context setting 818, and a providing-context setting 820.

The is-requestor flag 806, the EoP relevancy flag 808, and the block relevancy flag 810 can be set (e.g., turned on) for an application for which corresponding functionalities have been indicated as implemented by the application in the application registration table 600, for example. The is-requestor flag 806, the EoP relevancy flag 808, and the block relevancy flag 810 can be set for an application when the application actually participates in corresponding respective functionalities. Responder groups are described in more detail in U.S. patent application Ser. No. 17/718,770, filed on Apr. 12, 2022 entitled "DATA PRIVACY INTEGRATION SERVICES PROCESSING USING MULTIPLE WORK PACKAGES AND MULTIPLE RESPONDER GROUPS", the entire contents of which are hereby incorporated by reference.

An administrator can configure the synonymous keys flag 816 to authorize an application for adding of synonymous keys (e.g., when the synonymous keys ability flag 614 is set for the application in the application registration table 600). The administrator may know that some applications, although technically able to add synonymous keys, may not participate in adding synonymous keys for a current configuration of the landscape. An application 822 has value 824 of yes for the synonymous keys flag 816. A value of "App 1" 826 is provided for the providing-context setting 820 for the application 822. The value 826 can be included as a value for the using-context setting 818 for applications that use a context of the application 822 for resolution of common identifiers to local identifiers provided by the application 820. For instance a value 828 of "App 1" is configured for the using-context setting 818 for an application 830.

The value 828 being set for the using-context setting 818 for the application 830 and matching the value of the providing-context setting 820 for the application 822 can represent a situation illustrated, for example, by the first application 202 and the fifth application 214 in FIG. 2. The first application 202, which is integrated with the MDI service 212, can provide a context of "App 1" to the fifth application 214, and the fifth application 214 can use the context of "App 1" for DPI requests based on a situation of the fifth application 214 being integrated with the first application 202 and having information that has been replicated from the first application 202 to the second application 214. Runtime using of the context is described below.

Figure 9:
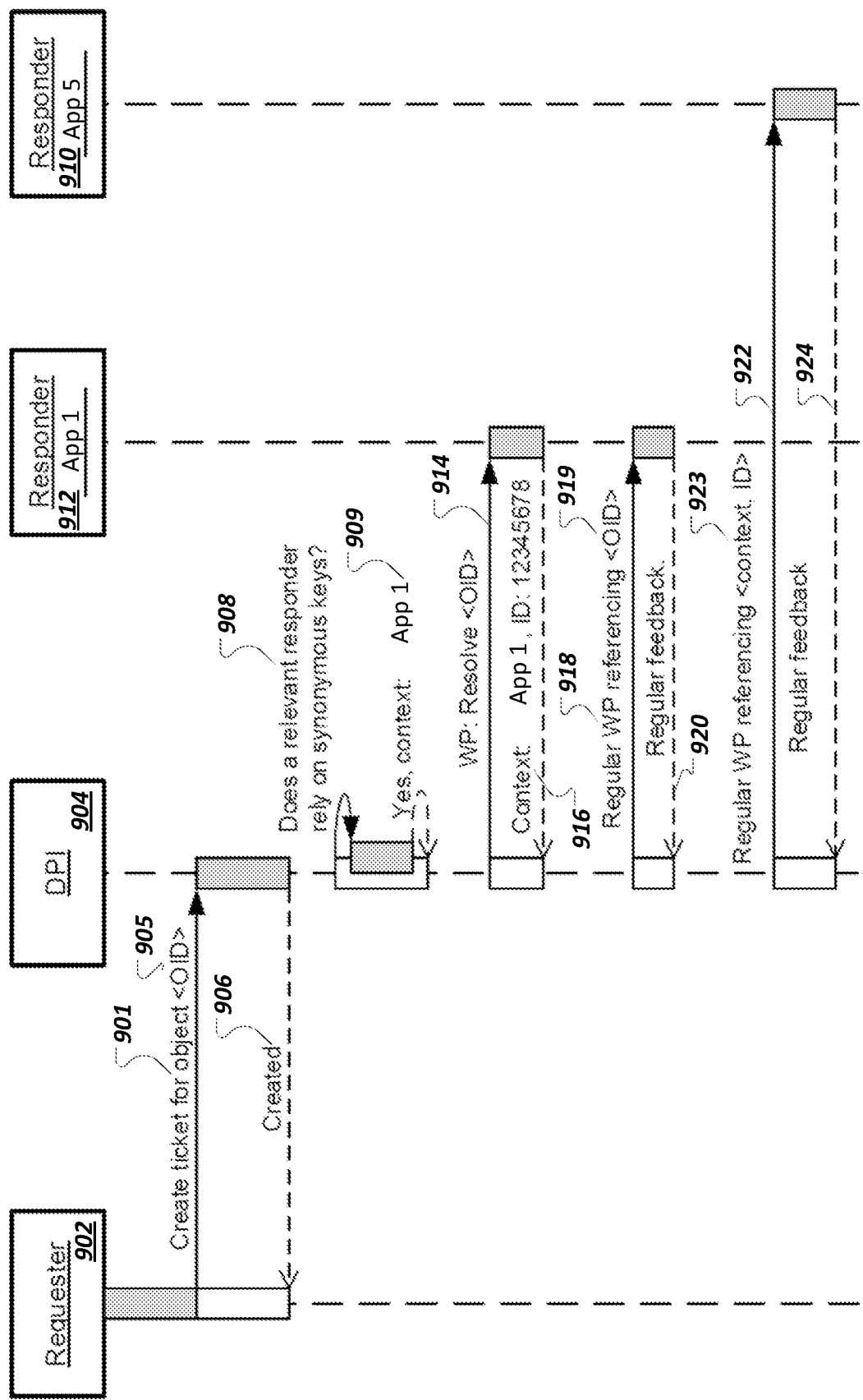
FIG. 9 is a swim lane diagram of an example process for using multiple synonymous identifiers in data privacy integration protocols.

FIG. 9 is a swim lane diagram of an example process 900 for using multiple synonymous identifiers in data privacy integration protocols.

At 901, a requester 902 sends a request to a DPI service 904 to create a ticket for an iEoP protocol. The request is for an object with a common OID 905. At 906, the DPI service 904 sends a response to the request to the requester 902.

At 908, the DPI service 904 determines whether any relevant responders rely on synonymous keys. For example, the DPI service 904 can make a determination 909 that a responder 910 may rely on a responder 912 for synonymous keys (e.g., based on the responder 912 having a using context of "App 1" configured in the configuration table 800).

At 914, the DPI service, in response to the determination 909, sends a resolution request to the responder 912 to resolve the common OID 905 included in the request sent by the requester 902. That is, the resolution request is a work package targeted to the responder 912 that provides the context used by the responder 910. The resolution request work package can be sent before any iEoP check work packages are sent, for example.

At 916, the responder 912 sends a response to the DPI service 904 after determining a local identifier corresponding to the common OID 905. The response sent by the responder 912 specifies a "providing" context (e.g., "App 1") and a local identifier (e.g., "12345678") corresponding to the common OID 905. That is, the responder 912 can respond with information that indicates, for the common OID 905, in the context of "App 1", a corresponding local identifier is "12345678". Although a string of "Context:App 1, ID:12345678" is shown, different types of formats can be used to represent the combination of the context and the local identifier. For example, a JSON (JavaScript Object Notation) format, such as {"context":"App 1", "key": "12345678" } can be used. As another example, the context and the identifier can be provided as a delimiter-separated string, such as "App 1:12345678". However, a selected separator character (e.g., ":") should be a character that is not used within the context name or the local identifier.

The responder 912 can locally perform the resolution from the common OID 905 to a local identifier. As another example, the responder 912 can forward the resolution request to another service or application and then forward a resolution to the DPI service 904 in response to the resolution request sent by the DPI service 904.

After the DPI service 904 receives the context and the local identifier from the responder 912 (and possibly other contexts and local identifiers for any other relevant responders that have other "using" contexts), the DPI service 904 can proceed with the iEoP (or other DPI) protocol. For applications that use the context for which the local identifier was received, the DPI service can send requests using the local identifier. For other applications that don't have a using context, the common OID 905 can be used.

For example, at 918, the DPI service 904 sends a regular work package (e.g., iEoP check) for processing the request from the requester 902 to the responder 912. The work package sent to the responder 912 includes an OID 919 that matches the common OID 905 included in the request from the requester 902. At 920, the responder 912 provides feedback in response to the regular work package after processing the work package (e.g., after performing a local EoP check for an object with an identifier matching the OID 919).

At 922, the DPI service 904 sends a regular work package for processing the request from the requester 902 to the responder 910. The work package sent to the responder 910 includes a context and local identifier 923 provided to the DPI service 904 by the responder 912 in the response to the resolution request. At 924, the responder 910 provides feedback in response to the regular work package after processing the work package (e.g., after performing a local EoP check for the object with the local identifier).

Figure 10:
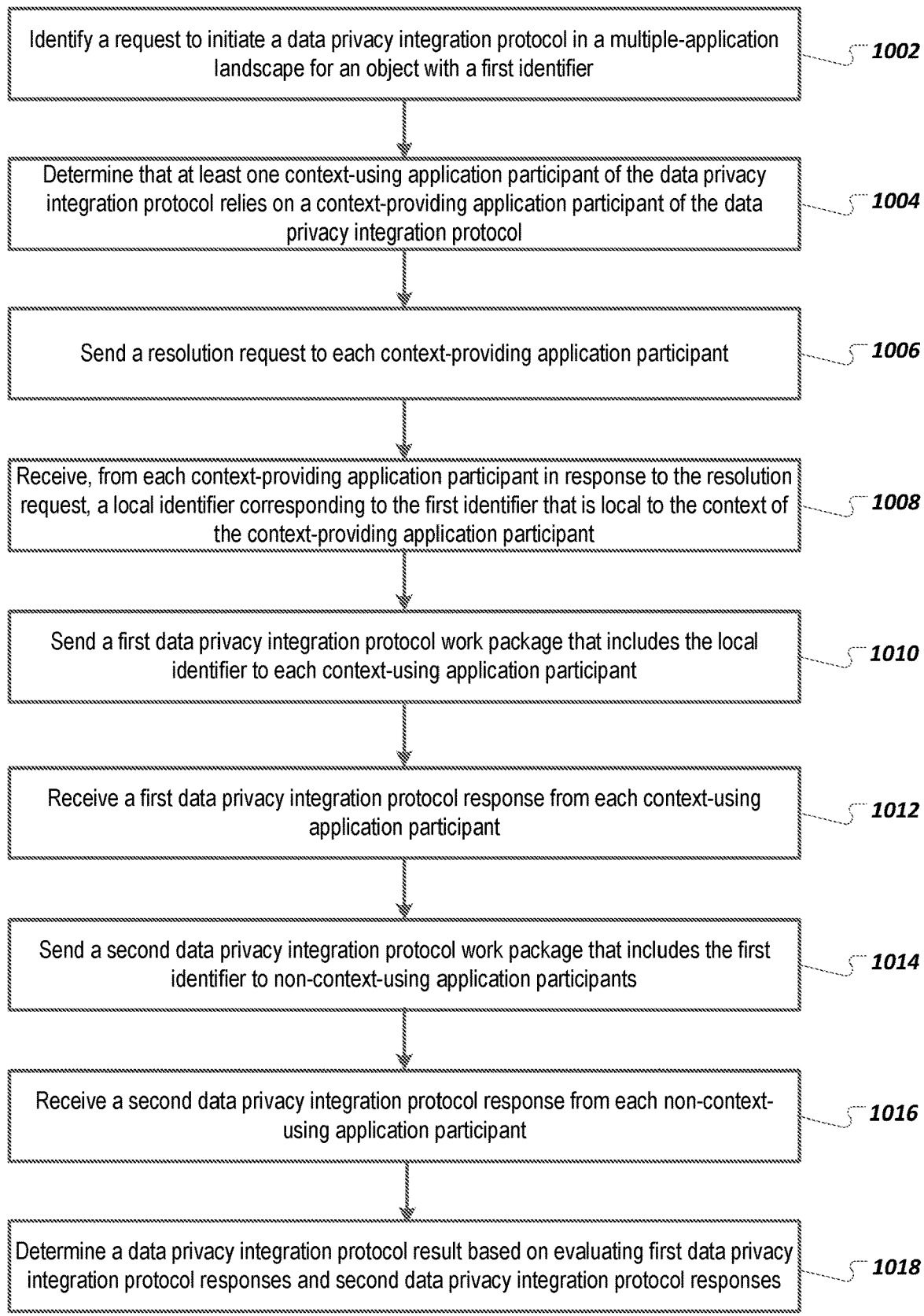
FIG. 10 is a flowchart of an example method for using multiple synonymous identifiers in data privacy integration protocols.

FIG. 10 is a flowchart of an example method for using multiple synonymous identifiers in data privacy integration protocols. It will be understood that method 1000 and related methods may be performed, for example, by any suitable system, environment, software, and hardware, or a combination of systems, environments, software, and hardware, as appropriate. For example, one or more of a client, a server, or other computing device can be used to execute method 1000 and related methods and obtain any data from the memory of a client, the server, or the other computing device. In some implementations, the method 1000 and related methods are executed by one or more components of the system 100 described above with respect to FIG. 5. For example, the method 1000 and related methods can be executed by the synonymous key engine 546 of FIG. 5.

At 1002, a request is identified to initiate a data privacy integration protocol in a multiple-application landscape for an object with a first identifier. The data privacy integration protocol can be an integrated end of purpose protocol and the request can be to determine whether the object can be blocked. The data privacy integration protocol can be an aligned purpose disassociation protocol and the request can be to determine whether a purpose can be disassociated from the object. The data privacy integration protocol can be an integrated personal data retrieval protocol, the object can correspond to a data subject, and the request can be to gather data concerning the data subject. The first identifier can be a common identifier understood by multiple applications of the multiple-application landscape. The common identifier can be assigned to the object by an object redistribution service such as a master data integration service.

The first identifier can be received in a request from a requester that initiates the data privacy integration protocol. As another example, an initial request from a requester can include a second identifier different from the first identifier and a resolution request can be sent to a first context-providing application participant to resolve the second identifier to a common identifier understood by multiple applications of the multiple-application landscape. The common identifier can be included, as the first identifier, in a modified request.

At 1004, a determination is made that at least one context-using application participant of the data privacy integration protocol relies on a context-providing application participant of the data privacy integration protocol for resolving the first identifier to a local identifier local to a context of the context-providing application participant. Context-using application participants can understand a local identifier of a context-providing protocol participant. Context-providing protocol participant can replicate data to a context-using protocol participant.

At 1006, a resolution request is sent to each context-providing application participant.

At 1008, a local identifier corresponding to the first identifier that is local to the context of the context-providing application participant is received, from each context-providing application participant in response to the resolution request.

At 1010, a first data privacy integration protocol work package that includes the local identifier is sent to each context-using application participant.

At 1012, a first data privacy integration protocol response is received from each context-using application participant that includes a result of a respective context-using participant executing the first data privacy integration protocol work package using the local identifier.

At 1014, a second data privacy integration protocol work package that includes the first identifier is sent to each protocol application participant other than context-using application participants.

At 1016, a second data privacy integration protocol response is received from each non-context-using application participant that includes a result of a respective non-context-using participant executing the second data privacy integration protocol work package using the first identifier.

At 1018, a data privacy integration protocol result is determined based on evaluating first data privacy integration protocol responses received from context-using application participants and second data privacy integration protocol responses received from non-context-using application participants.

Other options are possible. For example, a second request can be received that includes a second identifier from a first context-using application. A second resolution request can be sent to a first context-providing application to resolve the second identifier to a local identifier and the local identifier can be provided in a third data privacy integration work package to a second context-using application. Further or other chaining of identifiers can be performed so that ultimately each application receives an identifier understood by the application.

Figure 11:
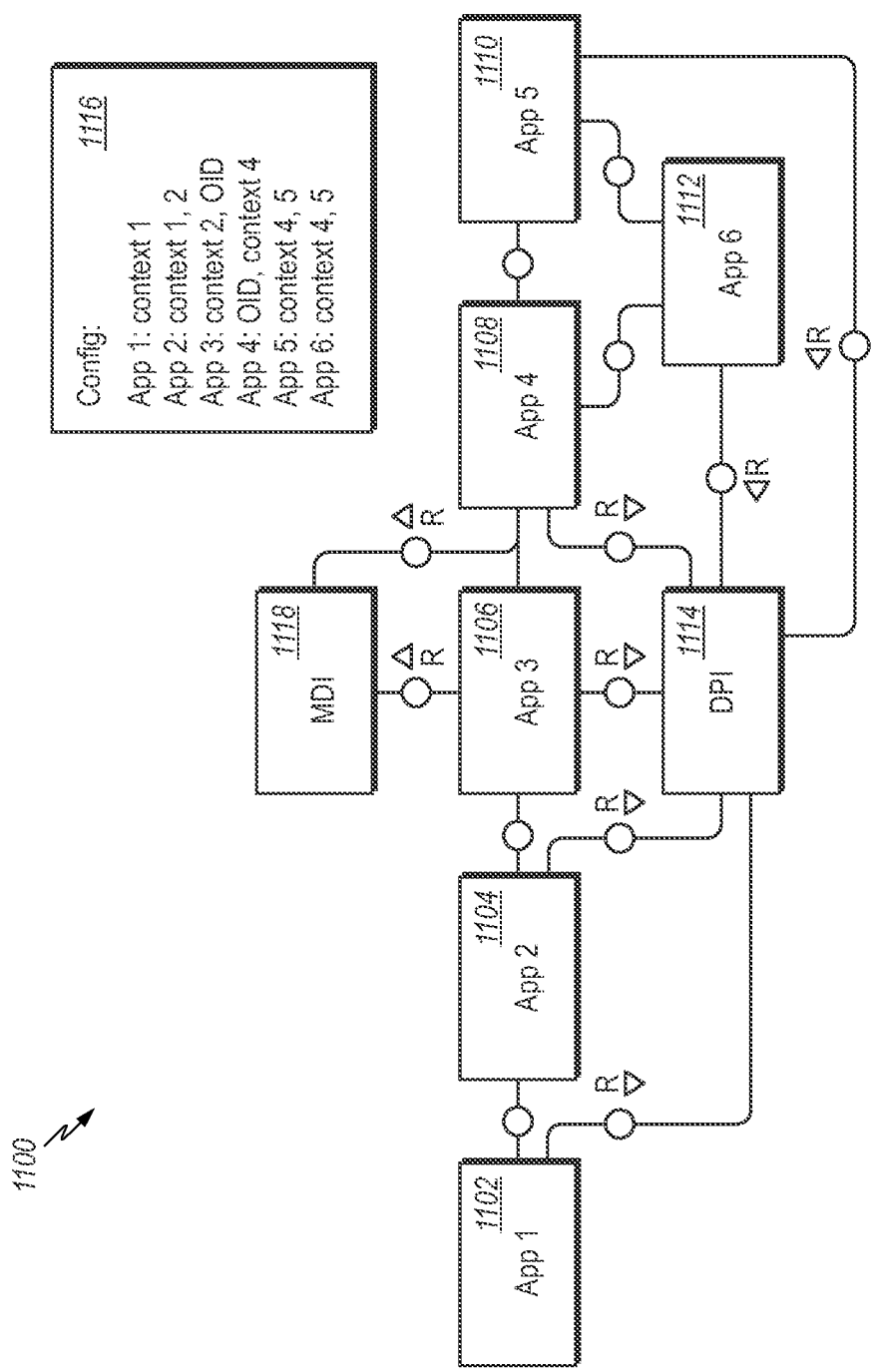
FIG. 11 illustrates an example system for chaining context-providing and context-using applications.

FIG. 11 illustrates an example system 1100 for chaining context-providing and context-using applications. The system 1100 includes a first application 1102, a second application 1104, a third application 1106, a fourth application 1108, a fifth application 1110, and a sixth application 1112 that are each connected to a DPI service 1114. The first application 1102, which is connected to the second application 1104, understands a first context (e.g., context 1), as indicated by configuration information 1116. The second application 1104 understands the first context and a second context and is connected to the third application 1106. The third application 1106 understands the second context and OIDs provided by a MDI service 1118. The fourth application 1108, which is connected to the fifth application 1110 and the sixth application 1112, understands a fourth context and OIDs provided by the MDI service 1118. The fifth application 1110 understands the fourth context and a fifth context. The sixth application 1112, which is connected to the fifth application 1110, understands the fourth context and the fifth context. As described below, chaining of resolution can occur based on the connections of the system 1100 and the configuration information 1116.

Figure 12:
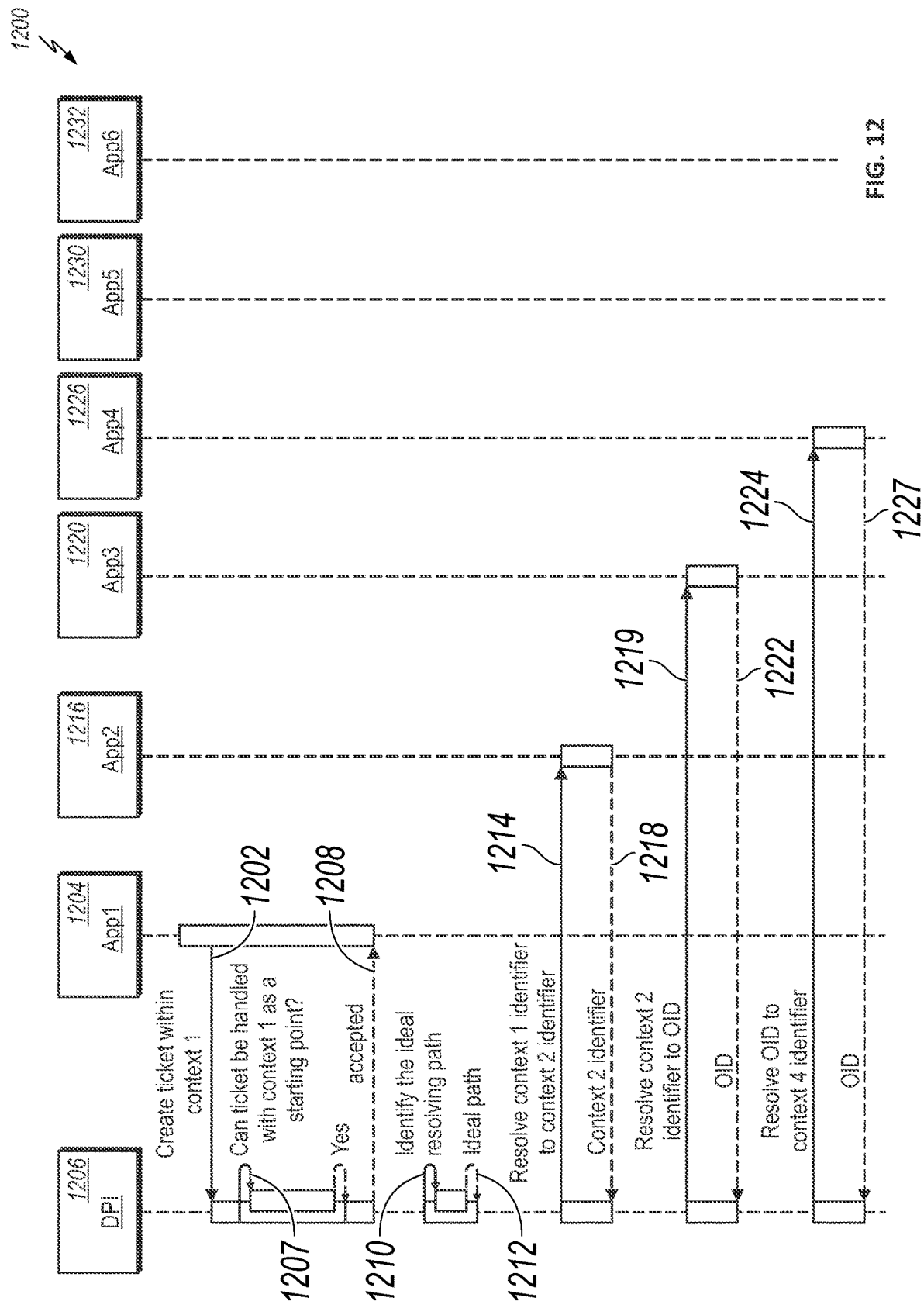
FIG. 12 is a swim lane diagram of an example process for using chains of context-using and context-providing applications.

FIG. 12 is a swim lane diagram of an example process 1200 for using chains of context-using and context-providing applications. At 1202, a first application 1204 sends a request to a DPI service 1206 to create a DPI protocol ticket with a first context (e.g., the applications shown in FIG. 12 can understand contexts in accordance with the system 1100 and the configuration information 1116 described above with respect to FIG. 11).

At 1207, the DPI service 1206 determines whether the ticket can be handled using the first context as a starting context. In this example, the DPI service 1206 can determine that the ticket can be handled using the first context as a starting context. For example, the DPI service 1206 can analyze the configuration information 1116 and determine that a chaining path (e.g., using context-using and context-providing application(s) can be formed for each application in the landscape so that each application receives a request using a context understood by the respective application. At 1208, in response to determining that the ticket can be handled using the first context as a starting context, the DPI service 1206 sends a ticket acceptance indication to the first application 1202.

At 1210, the DPI service 1206 determines an ideal resolution path 1212 for handling the ticket. The ideal resolution path 1212 may include a smallest aggregate path, a smallest number of resolution requests needed to achieve overall resolution, etc. Further details of ideal resolution path determination are described below.

At 1214, based on the DPI service 1206 evaluating the ideal resolution path 1212 and determining that a second application 1216 understands the first context and a second context, the DPI service 1206 sends a resolution request to the second application 1216 requesting that the second application 1216 resolve a first context identifier (or identifiers) from the first context to corresponding second context identifier(s) in the second context. At 1218, the second application 1216 provides requested second context identifier(s) to the DPI service 1206. Although not shown in FIG. 12, communication between respective applications and the DPI service 1206 can be performed using an event bus (as an alternative to direct communication), and communication can be performed using work packages.

At 1219, based on continued evaluation of the ideal resolution path 1212 and the DPI service 1206 determining that a third application 1220 understands the second context and OIDs provided by a MDI service, the DPI service 1206 sends a resolution request to the third application 1220 requesting that the third application 1220 resolve a second context identifier (or identifiers) from the second context to corresponding OID(s). At 1222, the third application 1220 provides requested OID(s) to the DPI service 1206.

At 1224, based on continued evaluation of the ideal resolution path 1212 and the DPI service 1206 determining that a fourth application 1226 understands a fourth context and OIDs provided by the MDI service, the DPI service 1206 sends a resolution request to the fourth application 1226 requesting that the fourth application 1226 resolve an OID (or OIDs) to corresponding fourth context identifiers. At 1227, the fourth application 1226 provides requested fourth context identifier(s) to the DPI service 1206. The DPI service 1206 can determine, based on received responses to resolution requests, that the DPI service 1206 can now send protocol request(s) to each landscape application, for handling of the ticket, using identifier(s) understandable by each application. For instance, the DPI service 1206 can determine that a fifth application 1228 and a sixth application 1230 each understand the fourth context and that resolution to a fifth context is not necessary because each application can understand a context for which a resolution request was performed. Accordingly, the DPI service 1206 can proceed with handling the ticket, by sending respective protocol request(s) to each application (e.g., using work packages, according to responder group configurations, etc.).

In some implementations, rather than pre-DPI-protocol handling, identifier resolving might happen during DPI protocol handling. For example, the DPI service 1206 might, in a scenario with 3 responder groups, first only resolve the identifiers that applications in the first responder group need to execute their work packages. The identifiers that are required for the second responder group, might be resolved in parallel to the first responder group executing their DPI protocol work packages, for example. Then, for example, if the first responder group raises a veto, the third responder group does not need to be asked to provide their votes, and therefore, the computing effort to resolve the identifier to such identifiers understood by the third responder group is not necessary. As another example, identifiers might be resolved right before a responder group receives the work packages to provide their vote. Accordingly, the work package to resolve the identifier might be sent only when it is 100% clear that the responder is to provide their vote (e.g., because all previous responder groups provided their feedback to the work package without a veto). In some implementations, the DPI service 1206 can use obtained information about which responder is able to resolve which identifier from which context to which other context to automatically assign responder groups, along with other information that may be used for responder group assignments.

In some implementations, the determination of the ideal resolution path 1212 can include evaluation of meta information, historical information, and/or statistical information. For example, if several paths are possible to resolve an initial identifier into further identifiers so that every application in the landscape can identify the object with at least one identifier, the applications might include an attribute in resolution request feedback to the DPI service 1206 regarding how much computing effort was involved for performing the resolution. The DPI service 1206 can, over time, include evaluation of estimated direct resolution costs that are determined based on historical costs when selecting the ideal resolution path 1212. For example, a first candidate resolution path might have a lower estimated cost than a second candidate resolution path, so the DPI service 1206 may select the first candidate resolution path as the ideal resolution path 1212. In some implementations and from time to time, the DPI service 1206 might choose a path with a higher estimated cost so as to receive more current cost statistics for updating of cost estimations (e.g., what had previously been a higher-cost resolution path may not be a lower-cost resolution path). Furthermore, the DPI service 1206 can consider resolution request failures (e.g., failure to respond to resolution requests) when determining the ideal resolution path 1212. For example, the DPI service may have previously asked the second application 1216 1000 times to resolve from the first context to the second context, and 1000 times to resolve from the first context to the third context, and resolving from the first context to the second context might have failed in 10% of all cases and resolving from the second context to the third context might have failed in 1% of all cases, so the DPI service 1206 might select a path subset that is less likely to fail (e.g., asking the second application to resolve from the second context to the third context) than another available path subset (e.g., asking the second application 1216 to resolve from the first context to the second context). Overall per-application resolution failure rates may also be considered (e.g., the DPI service 1206 may try to avoid sending a resolution request to an application that in general, is more likely to not respond than other applications.

As an example of multiple candidate resolution paths, suppose that instead of the configuration information 1116, landscape applications are configured as follows, with regards to context understood by respective applications: App 1: Context 1; App 2: Context 1, 2, 3; App 3: Context 2, 3; App 4: Context 2, 3, 4; App 5: Context 4. Since each of "App 2", "App 3", and "App 4" understand both second and third contexts, the DPI service 1206 can, in this example, ask the second application to resolve the first context to the second context, the third context, or both contexts, as alternative path choices. Selection of a particular path can be made based on various criteria, as described above.

In some cases, the DPI service 1206 may send resolution requests that aren't strictly necessary in light of the ideal resolution path 1212, for further evaluation, analysis, and error-checking. For instance, in the example of FIG. 12, the DPI service 1206 may ask both the fifth application 1228 and the sixth application 1230 to resolve from the fourth context to the fifth context. The DPI service 1206 can determine whether resolved identifiers in the fifth context received from the fifth application 1228 and the sixth application 1230 match. If the received identifiers don't match, error resolution can be triggered for further analysis. In general, the DPI service 1206 may periodically send resolution requests that are normally not necessary, such as for a certain number of ticket requests, for testing and statistical generation purposes.

As another example, the DPI service 1206 may, such as for large tickets, use multiple candidate resolution paths including paths that may otherwise not be considered ideal paths. For example, the DPI service 1206 may receive a large ticket request, from a large company, who, for example, may submit large ticket(s) for a large number of objects representing customers of the company. For example, a ticket may be received for 4,000 master data objects. In this example, the DPI service 1206 may identify different candidate resolution paths (e.g., a first path that starts with an "App1" requestor, then proceeds to an App2, then an App4, and a second path that starts with App1, then proceeds to an App3, then the App4). The DPI service 1206 may determine to divide resolution processing by using the first path for 3,000 of the master data objects and the second path for 1,000 of the master data objects, for example.

Other examples of the DPI service 1206 determining which resolution path to include can include computing cost considerations, such as costs incurred from use of purchased third party cloud computing or other services by responders. For example, the DPI service 1206 may be affiliated with a software provider who owns some of the responders and the DPI service 1206 can include selection of resolution paths so as to distribute costs among responders according to a cost policy. A cost policy can include shifting some resolution costs to third-party responders to balance costs incurred by the software provider with overall performance of the DPI protocols, for example.

The preceding figures and accompanying description illustrate example processes and computer-implementable techniques. But system 500 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 500 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
    identifying a request to initiate a data privacy integration protocol in a multiple-application landscape for an object with a first identifier;
    determining that at least one context-using application participant of the data privacy integration protocol relies on a context-providing application participant of the data privacy integration protocol for resolving the first identifier to a local identifier local to a context of the context-providing application participant;
    sending a resolution request to each context-providing application participant that can provide resolution for at least one context-using application;
    receiving, from each context-providing application participant in response to the resolution request, a local identifier corresponding to the first identifier that is local to the context of the context-providing application participant;
    sending a first data privacy integration protocol work package that includes the local identifier to each context-using application participant;
    receiving a first data privacy integration protocol response from each context-using application participant that includes a result of a respective context-using participant executing the first data privacy integration protocol work package using the local identifier;
    sending a second data privacy integration protocol work package that includes the first identifier to each protocol application participant other than context-using application participants;
    receiving a second data privacy integration protocol response from each non-context-using application participant that includes a result of a respective non-context-using participant executing the second data privacy integration protocol work package using the first identifier; and
    determining a data privacy integration protocol result based on evaluating first data privacy integration protocol responses received from context-using application participants and second data privacy integration protocol responses received from non-context-using application participants.

2. The computer-implemented method of claim 1, wherein the data privacy integration protocol is an integrated end of purpose protocol and the request is to determine whether the object can be blocked.

3. The computer-implemented method of claim 1, wherein the data privacy integration protocol is an aligned purpose disassociation protocol and the request is to determine whether a purpose can be disassociated from the object.

4. The computer-implemented method of claim 1, wherein the data privacy integration protocol is an integrated personal data retrieval protocol, the object corresponds to a data subject, and the request is to gather data concerning the data subject.

5. The computer-implemented method of claim 1, wherein a first context-using application participant understands the local identifier of a first context-providing protocol participant.

6. The computer-implemented method of claim 5, wherein the first context-providing protocol participant replicates data including an object with the local identifier to the first context-using protocol participant.

7. The computer-implemented method of claim 1, wherein the first identifier is a common identifier understood by multiple applications of the multiple-application landscape.

8. The computer-implemented method of claim 7, wherein the common identifier is assigned to the object by an object redistribution service.

9. The computer-implemented method of claim 8, wherein the object redistribution service is a master data integration service.

10. The computer-implemented method of claim 1, wherein the first identifier is received in a request from a requester that initiates the data privacy integration protocol.

11. The computer-implemented method of claim 1, wherein an initial request from a requester includes a second identifier different from the first identifier, the method further comprising:
    sending a second resolution request to a first context-providing application participant to resolve the second identifier to a common identifier understood by multiple applications of the multiple-application landscape;
    receiving the common identifier as the first identifier in response to the second resolution request; and
    modifying the initial request to include the first identifier rather than the second identifier.

12. The computer-implemented method of claim 1, further comprising:
    receiving a second request that includes a second identifier from a first context-using application;
    sending a second resolution request to a first context-providing application to resolve the second identifier to a local identifier; and
    providing the local identifier in a third data privacy integration work package to a second context-using application.

13. The computer-implemented method of claim 1, further comprising receiving, from a first context-providing application participant in response to the resolution request, along with the local identifier, a second local identifier corresponding to the first identifier that is local to a second context understood by the context-providing application participant.

14. A system comprising:
one or more computers; and
a computer-readable medium coupled to the one or more computers having instructions stored thereon which, when executed by the one or more computers, cause the one or more computers to perform operations comprising:
identifying a request to initiate a data privacy integration protocol in a multiple-application landscape for an object with a first identifier;
determining that at least one context-using application participant of the data privacy integration protocol relies on a context-providing application participant of the data privacy integration protocol for resolving the first identifier to a local identifier local to a context of the context-providing application participant;
sending a resolution request to each context-providing application participant that can provide resolution for at least one context-using application;
receiving, from each context-providing application participant in response to the resolution request, a local identifier corresponding to the first identifier that is local to the context of the context-providing application participant;
sending a first data privacy integration protocol work package that includes the local identifier to each context-using application participant;
receiving a first data privacy integration protocol response from each context-using application participant that includes a result of a respective context-using participant executing the first data privacy integration protocol work package using the local identifier;
sending a second data privacy integration protocol work package that includes the first identifier to each protocol application participant other than context-using application participants;
receiving a second data privacy integration protocol response from each non-context-using application participant that includes a result of a respective non-context-using participant executing the second data privacy integration protocol work package using the first identifier; and
determining a data privacy integration protocol result based on evaluating first data privacy integration protocol responses received from context-using application participants and second data privacy integration protocol responses received from non-context-using application participants.

15. The system of claim 14, wherein the data privacy integration protocol is an integrated end of purpose protocol and the request is to determine whether the object can be blocked.

16. The system of claim 14, wherein the data privacy integration protocol is an aligned purpose disassociation protocol and the request is to determine whether a purpose can be disassociated from the object.

17. The system of claim 14, wherein the data privacy integration protocol is an integrated personal data retrieval protocol, the object corresponds to a data subject, and the request is to gather data concerning the data subject.

18. A non-transitory, computer-readable medium coupled to one or more processors and having instructions stored thereon which, when executed by the one or more processors, cause the one or more processors to perform operations, the operations comprising:
identifying a request to initiate a data privacy integration protocol in a multiple-application landscape for an object with a first identifier;
determining that at least one context-using application participant of the data privacy integration protocol relies on a context-providing application participant of the data privacy integration protocol for resolving the first identifier to a local identifier local to a context of the context-providing application participant;
sending a resolution request to each context-providing application participant that can provide resolution for at least one context-using application;
receiving, from each context-providing application participant in response to the resolution request, a local identifier corresponding to the first identifier that is local to the context of the context-providing application participant;
sending a first data privacy integration protocol work package that includes the local identifier to each context-using application participant;
receiving a first data privacy integration protocol response from each context-using application participant that includes a result of a respective context-using participant executing the first data privacy integration protocol work package using the local identifier;
sending a second data privacy integration protocol work package that includes the first identifier to each protocol application participant other than context-using application participants;
receiving a second data privacy integration protocol response from each non-context-using application participant that includes a result of a respective non-context-using participant executing the second data privacy integration protocol work package using the first identifier; and
determining a data privacy integration protocol result based on evaluating first data privacy integration protocol responses received from context-using application participants and second data privacy integration protocol responses received from non-context-using application participants.

19. The computer-readable medium of claim 18, wherein the data privacy integration protocol is an integrated end of purpose protocol and the request is to determine whether the object can be blocked.

20. The computer-readable medium of claim 18, wherein the data privacy integration protocol is an aligned purpose disassociation protocol and the request is to determine whether a purpose can be disassociated from the object.

* * * * *